United States Patent [19]

Evans et al.

[11] Patent Number: 5,412,377
[45] Date of Patent: May 2, 1995

[54] UNIVERSAL REMOTE CONTROL PROGRAM SCHEDULING SYSTEM

[76] Inventors: Benjamin F. Evans, 47 Burton Hill Rd., Weatherford, Tex. 76086; Jerry J. Heep, 111 Wildflower Trail, Weatherford, Tex. 76087

[21] Appl. No.: 198,690

[22] Filed: Feb. 18, 1994

Related U.S. Application Data

[63] Continuation of Ser. No. 830,795, Feb. 17, 1994, abandoned, which is a continuation of Ser. No. 562,780, Jun. 8, 1990, abandoned.

[51] Int. Cl.$^6$ ............................................. G05B 19/02
[52] U.S. Cl. ........................... 340/825.22; 340/825.69; 340/825.72; 341/176
[58] Field of Search ................ 340/825.22, 825.24, 340/825.69, 825.72, 825.56, 309.15, 309.15, 309.4, 309.6; 455/151.2, 352, 171.1, 231, 151.4; 359/42, 46, 48; 348/734; 341/176; 364/143-145; H04N 5/44

[56] References Cited

U.S. PATENT DOCUMENTS

| | | | |
|---|---|---|---|
| 4,279,012 | 7/1981 | Beckedorff et al. | 340/309.4 |
| 4,325,081 | 4/1982 | Abe et al. | 340/309.4 |
| 4,706,121 | 11/1987 | Houng | 340/825.22 |
| 4,718,112 | 1/1988 | Shinoda | 455/151 |
| 4,796,107 | 1/1989 | Hiraki | 455/171 |
| 4,825,200 | 4/1989 | Evans et al. | 340/825.72 |

*Primary Examiner*—Donald J. Yusko
*Assistant Examiner*—Edwin C. Holloway, III

[57] ABSTRACT

A method and apparatus for scheduling operating sessions to be performed by a group of remotely controlled devices. A remote controller is used to operate the remotely controlled devices at selected times scheduled by the user. The operating sessions may be programmed to be performed on a daily or weekly basis without continued reprogramming by the user.

8 Claims, 4 Drawing Sheets

UNIVERSAL REMOTE CONTROL PROGRAM SCHEDULING SYSTEM

This is a Continuation of application Ser. No. 07/830,795, filed Feb. 17, 1994, now abandoned, which is a continuation of Ser. No. 07/562,780, filed Jun. 8, 1990, now abandoned.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

REFERENCE TO APPENDIX

This application includes an attached appendix including an assembly language listing.

BACKGROUND OF THE INVENTION

The present invention relates to universal remote controls. More particularly, the present invention is a method and apparatus for operating remotely controlled devices according to a schedule set up by the user.

A reconfigurable remote control transmitter is a transmitter used to control a plurality of remotely controlled products. Often, each of a plurality of products can be controlled from its own associated remote control transmitter. For example, there may be one remote control transmitter associated with a television receiver, another associated with a video cassette recorder and another associated with a turntable of a stereo system. The reconfigurable remote control transmitter is capable of learning the signals (typically infrared (I/R) signals) used by a plurality of such remote control devices so that a single remote control transmitter can be used to control a plurality of products.

Remotely controlled devices such as video cassette recorders often include internal timer functions which can be set to operate the device in the user's absence. In the case of a VCR, the typical internal timer may store four programming sessions which consist of a start time, an end time, and a day of the week. When the user is away and the proper time and day arrives, the VCR is turned on and put in recording mode. Upon reaching the end time, the VCR is turned off. A problem with this system for recording is that the user must reprogram the internal timer after it has executed a stored instruction. For example, if a user wants to record a program which is on each day of the week at the same time, the VCR must be reprogrammed each day. An alternative is to program all of the programming sessions to record that show each day during the week. This would mean that no other programs can be recorded and all four timer slots would be devoted to the single program. If the user were gone for the whole week, he would not be able to record any program except the chosen one.

Another problem encountered in programming VCR recording sessions is the need to reprogram on a weekly basis. If the user wants to record the same show, which is on each week at the same time, he must reprogram the VCR each week (or every other week where a two-week timer is included). A user may forget to reprogram and will miss his show for the week.

Other remotely controlled devices do not include an internal timer at all. These devices cannot be used in the user's absence unless they are left on. Therefore, a user loses the opportunity to enjoy a variety of functions during his absence.

SUMMARY OF THE INVENTION

The present invention is a method and apparatus for remotely controlling a system during the absence of a user. In addition, even if the user is present, there is no need to reprogram a particular function after that function has been performed. A user can set that function to be performed on a daily or weekly basis. For example, a VCR can be programmed to record a particular program at the same time each week. Therefore, the problem of forgetting to reprogram the VCR to record a particular show is eliminated.

A universal remote control which can control the components of an audio-video system includes a scheduling function for performing a group of programmed operations at preselected times. The scheduling function contains an instruction flag which signifies the operations are either a one-time instruction, a multiple-day instruction, or a weekly instruction. If the user has set the instruction flag to the multiple-day setting, the programmed instructions will be carried out on more than one day at the same time. For example, if a user wants to program the controller to turn on the VCR and record the nightly news at 6 o'clock each weekday, he can set the instruction flag to the multiple-day setting. With the single record instruction set for the hour of 6 o'clock, the VCR will record the nightly news on each of the five weekdays, Monday through Friday.

The instruction flag can also be set to a single time setting. This will result in a one-time operating session being executed and the instruction being cleared from memory once it has been executed. A weekend setting can also be implemented to perform a set of instructions only on Saturdays and Sundays at the same time with the programming of a single instruction.

Another possibility is that the instruction flag is set to a weekly setting. In this setting, the operating session will be performed at the same time each week without the need for reprogramming.

For a complete understanding of the nature and advantages of the invention, reference should be made to the ensuing detailed description taken in conjunction with the accompanying drawings.

DETAILED DESCRIPTION OF THE DRAWINGS

To facilitate discussion of the present invention, an overview of a reconfigurable remote control transmitter will be provided before describing the scheduling system of the invention.

Figure 1A:
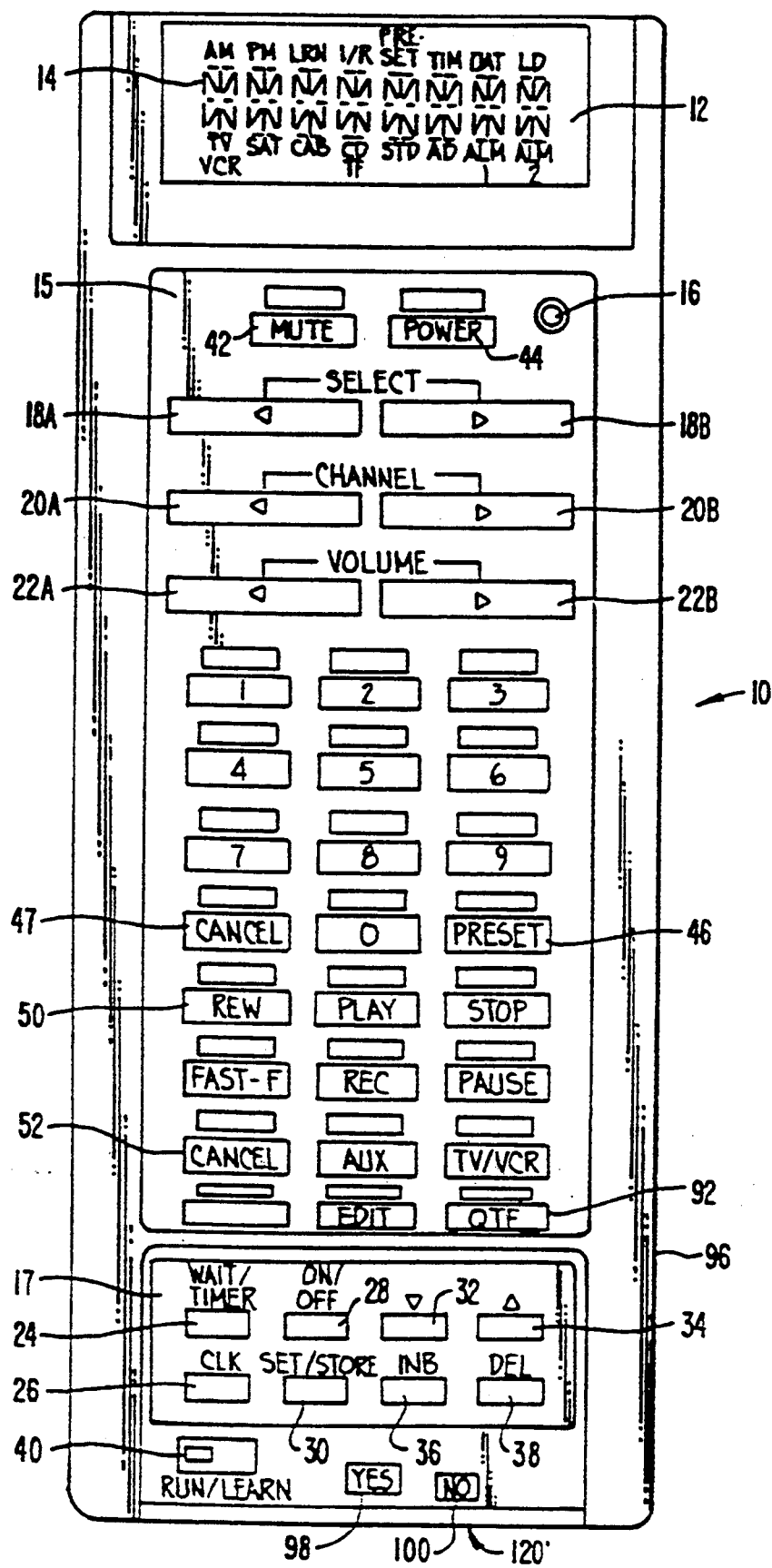
FIGS. 1A and 1B are front plan views of a reconfigurable remote control transmitter.
Figures 1B, 1C:
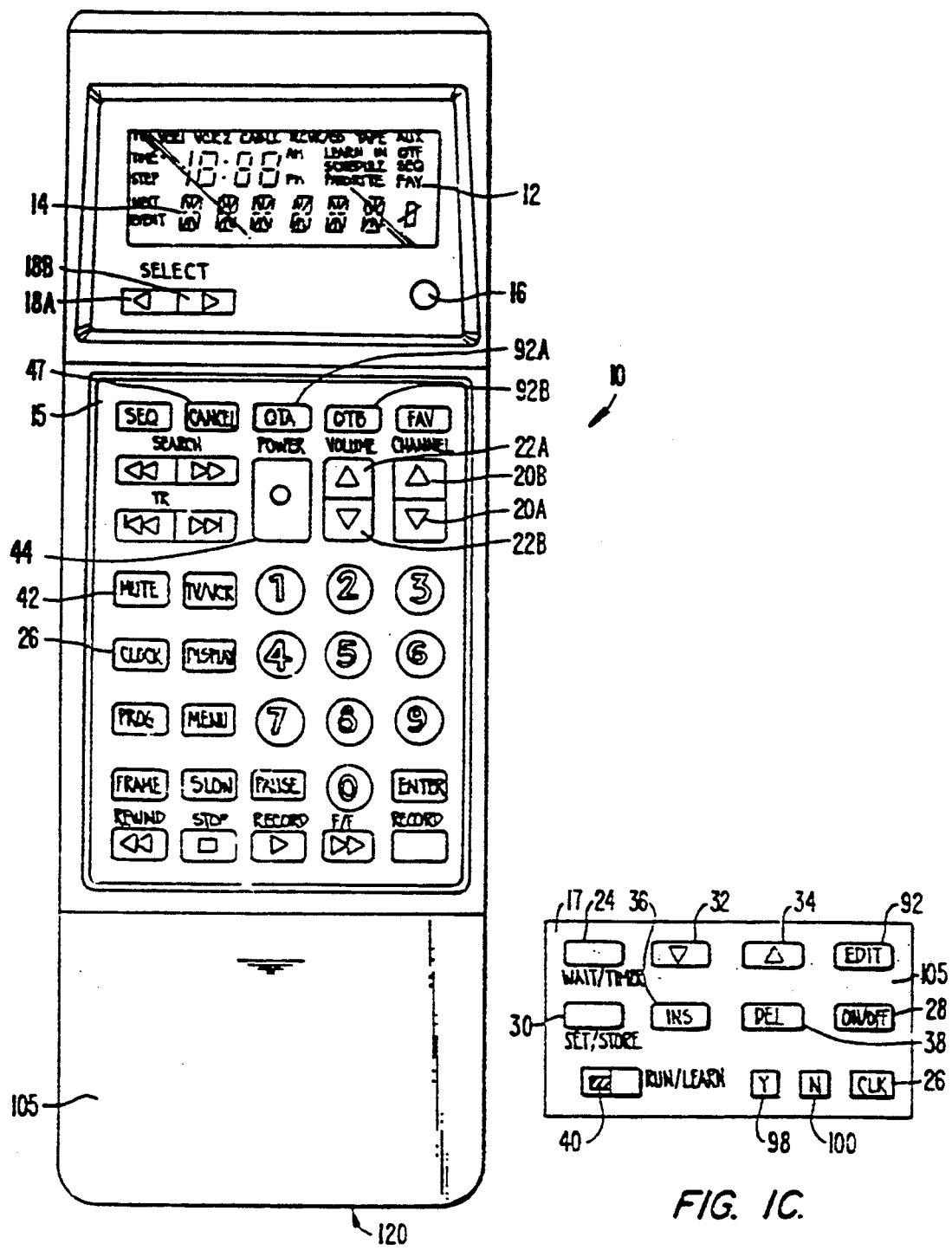
FIG. 1C is a view of the keys hidden beneath the cover at the bottom of the reconfigurable remote control transmitter of FIG. 1B.

As seen in FIGS. 1A and 1B, the transmitter unit 10, for a preferred embodiment of the invention, has a display 12, which may, for example, be a LCD display and a plurality of input keys. Display 12 is divided into three areas. The primary area 14 displays eight alphanumeric characters in conventional matrix form.

Above alphanumeric characters 14 is printed a plurality of functions and below the alphanumeric display is printed a plurality of device indications. A separate, selectively illuminable light source such as an LCD is positioned under each function indication and under each device indication.

In addition to display 12, controller 10 also has an area 15 containing keys which are normally used to operate a device, which keys are normally accessible, and an area 17 shown in FIG. 1C with respect to the controller of FIG. 1B, containing special function keys used for programming controller 10, setting of the clock and timers, and programming keys to perform multiple functions, which area may be normally covered to prevent tampering by children and others. Area 17 is hidden by cover 105 during normal operation of remote controller 10 of FIG. 1B. Area 15 has a light 16 which may be a light emitting diode, lamp, or other suitable electrically controlled source of light which is enabled when the system is receiving key codes from a dedicated controller and is illuminated when the I/R transmitter of the source controller is suitably positioned with respect to the I/R receiver of controller 10 so as to permit proper receipt of the transmitted codes. Light 16 will not be on during the reception of codes if the two controllers are too far apart, or are not sufficiently aligned so as to permit accurate receipt of the transmitted I/R codes.

Controller 10 has a plurality of keys in areas 15 and 17, some of which may be programmed to perform a desired function and some of which are dedicated to a particular function. The dedicated keys include SELECT keys 18A and 18B, which may be used, as will be described later, to select various devices or functions, CHANNEL keys 20A and 20B which may be used to step either down or up respectively to select a desired channel, station, or the like for a particular device being controlled and VOLUME CONTROL keys 22A and 22B which may be used to lower or increase the sound volume of a controlled device. The remaining keys having dedicated functions are in area 17 and include a WAIT/TIMER key 24, a CLOCK CONTROL key 26, an ON/OFF key 28, a SET/STORE key 30, a DOWN CURSOR key 32, an UP CURSOR key 34, an INSERT key 36, and a DELETE key 38. Area 17 also includes run/learn switch 40, the setting of which determines whether the controller is operating normally or to receive codes from a dedicated controller.

Area 15 also has a plurality of programmable keys each of which may either perform the function printed on the key or may be programmed to perform another function which a user may indicate in the blank space appearing above the key. Above the SELECT keys 18 are two keys 42 and 44 which may function as a MUTE key and a POWER key respectively. However, if desired, these keys may also be programmed to perform other functions in a manner to be described hereinafter. Below VOLUME keys 22, there are ten keys which are nominally indicated as number pads to be used, for example, for channel selection. The remaining keys are shown labelled with common controlled functions such as "sequence", "rewind", "play", "stop", "fast forward", "record", "pause", "cancel", "auxiliary", and "TV/VCR". However, if a function is required for a particular device being controlled which is not reflected on the controller keyboard, any of these keys may be programmed to perform such function for such device and such function may be marked in the blank space above the key. Also included are edit keys for use in scheduling quick touch programming. The use of these keys is described below.

Figure 2:
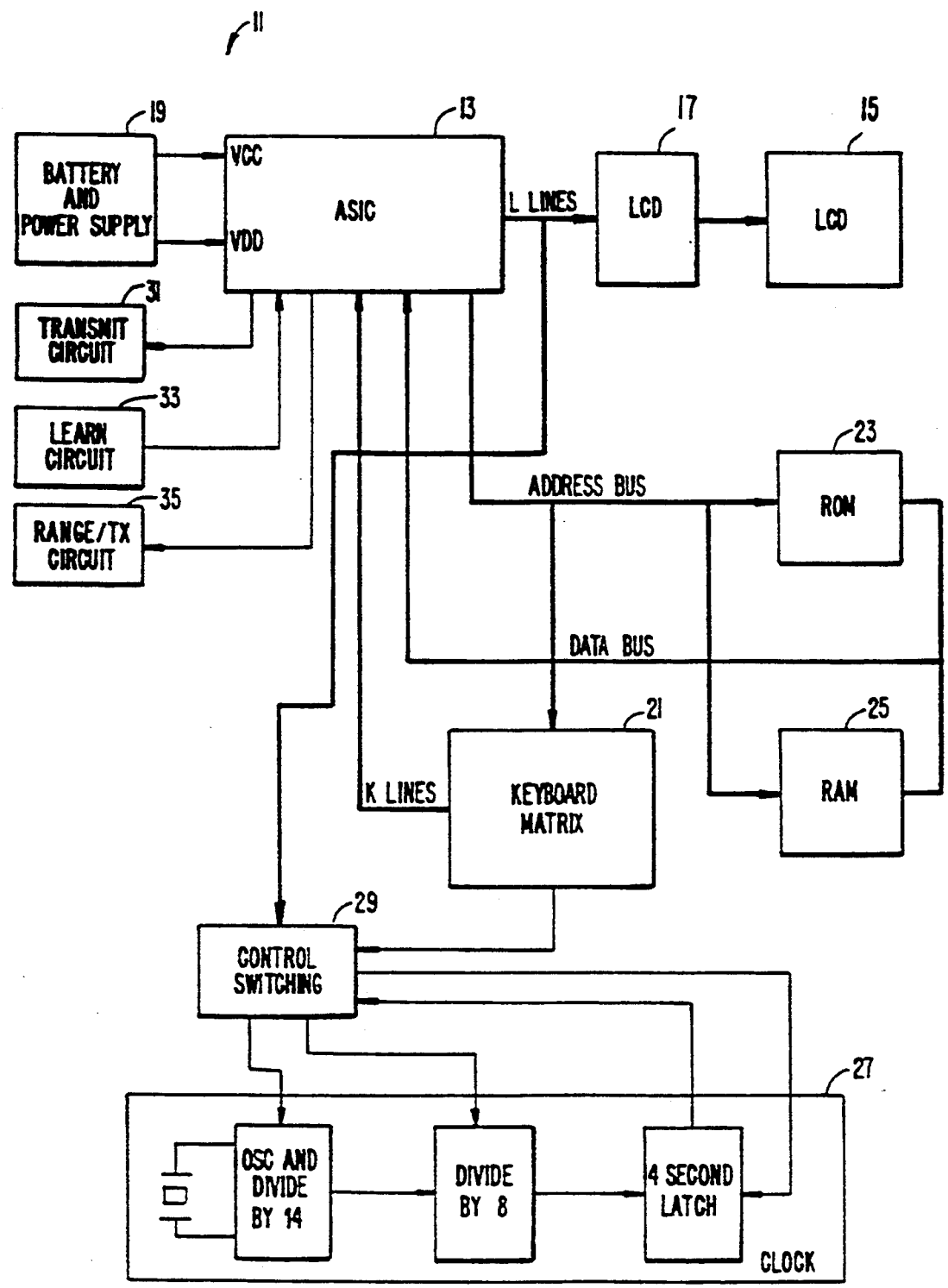
FIG. 2 is a schematic block diagram of the components of a universal remote controller.

FIG. 2 is a system level diagram of remote controller 10. Central processing unit (CPU) 13 is an application specific integrated circuit (ASIC) with a microprocessor core. CPU 13 is used to control the various components of remote controller 10. Liquid crystal display 12 is connected to CPU 13 through a liquid crystal display controller 17. Display 12 is used to display information to a user of remote controller 10. A battery and power supply 19 are used to power CPU 13 in remote controller 10.

A user may input instructions to remote controller 10 through a keyboard 21 including keys in areas 15 and 17. A ROM 23 is used to store code which is implemented in CPU 13 to carry out the different functions of remote controller 10. RAM 25 is used to store instruction codes learned by remote controller 10 as well as keystroke sequences input by a user on keyboard 21. The codes are compacted in order to minimize storage requirements. Compacted codes are transferred between RAM 25 and CPU 13 over the address bus and the data bus. RAM 25 also stores information relating to programmed code sequences to be performed by controller 10. The learning of various instructions and sequences of instructions from a dedicated controller is found in Evans, et al. U.S. Pat. No. 4,825,200, incorporated herein by reference.

A clock 27 is a real time clock which can be used to display the time on display 12 as well as for use in keeping track of an amount of time which has elapsed during the recording of a selected duration and for use in commencing and ending a programming session. A control switching unit 29 interfaces keyboard 21 to clock 27 so that the time may be changed as well as interfacing clock 27 to CPU 13 so that elapsed time may be tracked.

A transmit circuit 31 is used to transmit infrared signals from CPU 13 to the remotely controllable devices in the system. Learn circuit 33 is used to input infrared signals from a dedicated remote controller so that remote controller 11 can learn the signals for controlling the various devices. Range transmit circuit 35 is used to determine whether the dedicated controller is properly positioned during learning so that CPU 13 can recognize the infrared signals received from the dedicated controller.

When controller 10 is first powered by, for example, inserting batteries therein, there are no I/R commands stored in RAM 25 and clock 27 has not been set. The user must set clock 27 to the proper time and day in order for clock 27 and the timers in CPU 13 to function properly.

The next step in the operation is to store I/R codes in the I/R code storage RAM 25. The first step in this operation is to operate SELECT keys 18A and 18B to cause the annunciator for the device to be learned to be illuminated. The next step in the operation is to set run/learn switch 40 to the learn position. The next step in the operation is to point the I/R transmitter of the source controller, in this case the controller for the TV, at an I/R receiver 120 of controller 10 and to depress the function key on the source controller for the function to be learned. Thus, if the first function on the TV controller to be learned is the on/off function, the user would press the on/off button of the TV controller while holding this controller with its I/R transmitter facing the I/R receiver of controller 10.

At this point, the user would release the button on the source controller. The user then presses the key in area 15 of controller 10 which is to control the particular function for the particular device. Assuming, for example, that the on/off button of the TV controller is to be learned, the user might press POWER button 44 on controller 10 at this time. When the button on controller 10 is depressed, display 12 will show the message BEGIN. Now the user presses the on/off button on the TV controller to input the I/R code to controller 10. The key should remain depressed until display 12 on controller 10 shows the message STORED. At this time, the key may be released in a normal manner. This sequence of operations may be repeated for each of the keys of the source controller until the codes for all of those keys have been stored. When all of the codes for a given controller have been stored, the run/learn switch 40 is returned to the run position. Since the received I/R codes have a certain amount of redundancy, CPU 13 compacts these codes before storing them in RAM 25. When one of the codes stored in RAM 25 is to be utilized, CPU 13 decompacts the stored information to obtain the original I/R code. When all of the codes for a given device have been stored, the process described above may be repeated for the I/R controller of a second device.

Once controller 10 has been programmed, it may be utilized to control any one of the devices which it has been programmed to control or may, by use of a program key, be utilized to simultaneously control two or more of the devices. To use the controller, Run/Learn switch 40 is set to the run position.

The first step in using the controller to control a particular device is to operate SELECT keys 18A and/or 18B to illuminate the annunciator corresponding to the selected device. Controller 10 is then held with the I/R transmitter 138 pointed in the general direction of the device to be controlled and the key which has been programmed for the desired function on the desired device is operated. This causes the name of the key or function to appear on display 12 and causes the I/R code for the function to be output. When the first function for the device, such as turning it on, has been completed, a key may be depressed to cause a second function to be performed. For example, one or more of the numbered keys may be depressed to select a channel, or CHANNEL CONTROL keys 20A and/or 20B may be operated to perform this function.

If at any time a key is operated for which an I/R code has not been stored in RAM 25 for the selected device, there will be no I/R output from the device and an ERROR message appears on display 12 for a predetermined time duration, for example, three seconds. At the end of this time period, display 12 returns to the standard time and day display. If the cancel key is pressed during the three-second interval, the ERROR message is cancelled and the standard time and day message appears. Further description of a reconfigurable remote control transmitter is found in Evans, et al., U.S. Pat. No. 4,825,200 issued Apr. 25, 1989 incorporated herein by reference.

Figure 3:
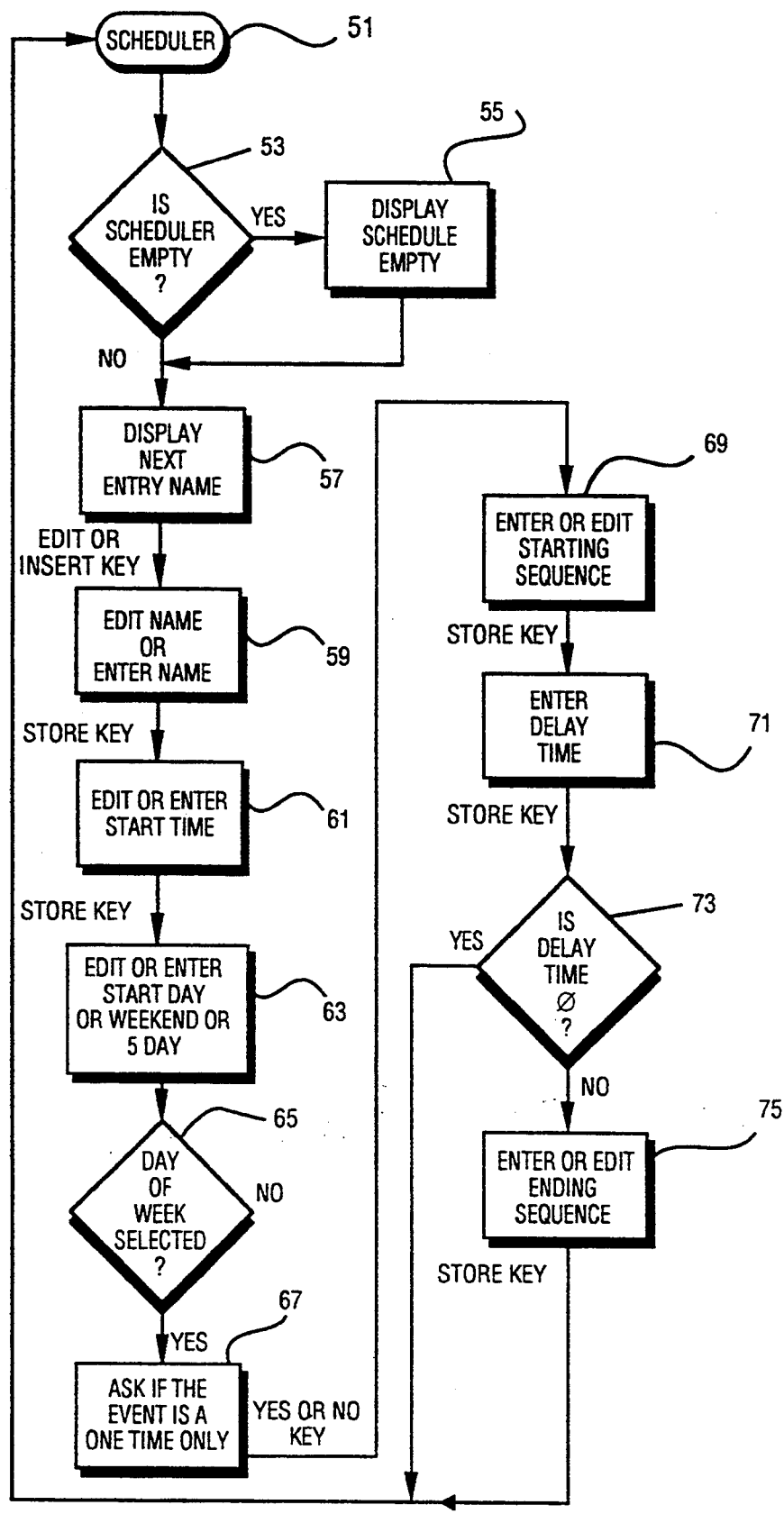
FIG. 3 is a flowchart showing the timing procedure for carrying out an operating session in a universal remote controller for operating a number of remotely controlled devices at pre-selected times.

FIG. 3 is a flowchart showing the sequence of events which take place as remote controller 10 receives programming instructions from a user for scheduling.

Initially, the user places remote control 10 in the scheduling mode (step 51) by pressing EDIT key 92. At this point, remote controller 10 determines whether or not the scheduler memory stored in RAM 25 is empty (step 53). If the scheduler memory is empty, the empty status is displayed on display 12 (step 55). If there are operating sessions which have been scheduled to be performed, the name of the next entry will be displayed on display 12 (step 57). This entry can then be edited or, alternatively, a new entry can be made (step 59). If the user wants to insert a new entry, he does so by pressing an INSERT key 36. A name is entered in step 59 by pressing the alpha keys on controller 10 and then pressing STORE key 30 to save the entry.

If an entry is to be edited, a series of steps are carried out for editing the entry in the schedule. First, the start time for the operating session is entered (step 61) by pressing the numeric keys. Next, AM or PM is chosen by pressing scroll keys 32,34. STORE key 30 is pressed to log the time in RAM 25. Once the start time is stored, the start date for performance is entered (step 63) by using scroll keys 32,34. As the scroll keys are pressed, the days of the week are displayed on display 12. When the desired day is displayed, store key 30 is pressed to enter the day in RAM 25. Also, in this step, an instruction flag is set indicating that this instruction is a weekend (Saturday/Sunday) event, or a weekday (Monday through Friday) event (step 63). Once the start date has been entered, the day of the week is selected (step 65) if it is a one-time event.

After the start date and the day of the week has been selected, the user enters information informing the controller if the event is a one-time-only event or a continuous weekly event. A flag is set to this effect (step 67) by pressing YES key 98 or NO key 100.

After all of the information needed to fully describe a particular programming session has been entered, a starting sequence is entered or edited (step 69). This sequence is entered by pressing a series of the preprogrammed function keys and then pressing STORE key 30. This sequence performs various functions such as turning on the VCR and the TV. A delay time (step 71) is entered representing the duration of the programming session. Entry is made by pressing the appropriate NUMBER keys on controller 10 and then pressing STORE key 30. For example, if a one-hour program is to be taped, a one hour delay time would be set and stored. If no delay time is entered, the program is directed back to the scheduling mode step (step 51) and may be entered during another edit session. If a delay time is entered, an ending sequence is requested (step 75). The ending sequence is a group of instructions which ends the operating session. Entry of the sequence is made by pressing a series of preprogrammed function keys followed by STORE key 30 in a manner similar to the entry of the starting sequence. For example, one instruction contained in the ending sequence may be to turn off the VCR. Once the ending sequence is entered, the program returns to the beginning of the scheduling mode (step 51) to either be exited or re-edited from the start.

The Appendix contains an assembly language listing of the subroutines used in conjunction with the scheduling function of a remote control transmitter.

In general, to those skilled in the art to which this invention relates, many changes in construction and widely differing embodiments and applications of the present invention will suggest themselves without departing from its spirit and scope. For instance, the multiple-day flag can be altered from signifying only weekend days or weekday days to two consecutive days, three consecutive days, or other permutations. Further, the remote controller can be programmed to operate a variety of remotely controllable devices in the user's absence. The scheduling is not limited to audio-video components. For example, an electric light equipped with an infrared receiver circuit may be turned on and off at various times in the user's absence to give the impression that the homeowner is home. In addition, more keys may be situated under cover 105 of FIG. 1B. Thus, the disclosures and descriptions herein are purely illustrative and are not intended to be in any sense limiting. The scope of the invention is set forth in the appended claims.

APPENDIX A

```
Scheduler Routines
Bubble Sort routine
(include MASTER2/SRC:1    ;Schedualer Maintenance)
      Page 33
                    01333
                    01334              This routine will sort assembly the Schedule memory and create
                    01335    assending order data (newest data first, oldest at the end.)
                    01336    Empty Locations are transfered to the end of memory
                    01337    The data is structured as follows:
                    01338
                    01339         dddhhhhh    d=day code, h=hour code (24 hour)
                    01340         00mmmmmm    m=minutes
                    01341         laanssss    aa=  11    daily five day      (day codes 0-4)
                    01342                          00    daily week end      (day codes 5-6)
                    01343                          01    weekly              (day codes 0-6)
                    01344                          10    weekly one shot     (day codes 0-6)
                    01345
                    01346                     ssss= 0-15  sequence code
                    01347                     n=    0    start sequence
                    01348                           1    stop sequence
                    01349
                    01350    After the data is sorted, x is returned pointing at the next event.  if
                    01351    x=255, the scheduler memory is empty.
                    01352
247B                01353  bubble:
247B   3F74         01354        clr    d,flags      reset the flags
247D   CD259A       01355        jsr    e,gentim     Load time registers
2480   5F           01356        clrx                init pointer
                    01357
2481                01358  day1:                     top of search Loop
2481   D6036A       01359        lda    x,sched+2    get byte to check
2484   2769         01360        beq    dobubb       go if hit empty spot
                    01361
2486   A460         01362        and    i,01100000b  mask in daily code
2488   2724         01363        beq    weekEN       go if week end type code
248A   A160         01364        cmp    i,01100000b  see if 5 day type code
248C   270A         01365        beq    day5         go if so
                    01366
248E                01367  day2:                     now bump the counter
248E   B643B745     01368        copy   temp3,temp5  re-init working current day code
2492   AD52         01369        bsr    adjsch       adjust the schedule pointer
2494   2759         01370        beq    dobubb       do sort if so
2496   20E9         01371        bra    day1.        Loop if not
                    01372
2498                01373  day5:           come here if x pints to 5 day type code
2498   B645         01374        Lda    d,temp5      get day copy
249A   A1A0         01375        cmp    i,10100000b  see if current day is week day
249C   2501         01376        blo    day5a        it is a weekday. process it
                    01377
                    01378  the current day is a week end. this schedule don't work on weekends.
249E   4F           01379        clra                tell em to start to work monday
                    01380
249F                01381  day5a:                    and process
249F   AD2B         01382        bsr    modday       install temp5 day into current day:hour
24A1   25EB         01383        bcs    day2         go if current time < reference (use it)
                    01384
                    01385  the current time is >= to target time.
24A3   B643         01386        Lda    d,temp3      get current day
24A5   AB20         01387        add    i,00100000b  create a new day
24A7   A1A0         01388        cmp    i,10100000b  it must be less than this to be a weekday
24A9   2501         01389        bLo    day5b        go if ok
24AB   4F           01390        cLra                make it monday again, if not
24AC   201A         01391  day5b: bra  weekEc        save it, install new day code and keep on tr
```

```
                01392
24AE            01393 weekEN:           come here if day at x is weekend wonder only
24AE  B645     01394        Lda    d,temp5         get current day code
24B0  A180     01395        cmp    i,10000000b     see what day it is
24B2  2202     01396        bhi    weekEa          go if today is a weekend day
24B4  A6A0     01397        Lda    i,10100000b     make it sat then
                01398
24B6            01399 weekEa:           and continue processing
24B6  AD14     01400        bsr    modday          install temp5 day into current day:hour
24B8  25D4     01401        bcs    day2            go if current time < reference (use it)
                01402
                01403 the current time is >= to target time
24BA  B643     01404        Lda    d,temp3         get current day
24BC  AB20     01405        add    i,00100000b     create a new day
24BE  A1C0     01406        cmp    i,11000000b     it cannot be higher than this
24C0  2204     01407        bhi    weekEb          go if so
                01408
                01409 data not out of high range. check low range
24C2  A180     01410        cmp    i,10000000b     it must be greater than this to be a weekend
24C4  2202     01411        bhi    weekEc          go if ok
24C6  A6A0     01412 weekEb: Lda    i,10100000b    make it saturday then
                01413
24C8            01414 weekEc:           and store it into register
24C8  AD02     01415        bsr    modday          install new day code (no chkday needed)
24CA  20C2     01416        bra    day2            and keep processing
                01417 ----------------------------------------------------------------
24CC            01418 modday:           install current temp5 day into day:hour data
24CC  B745     01419        sta    d,temp5         install temp data
24CE  D60368   01420        Lda    x,sched         get the day:hours data
24D1  A41F     01421        and    i,00011111b     mask out day code
24D3  BA45     01422        ora    d,temp5         install this new one
24D5  D70368   01423        sta    x,sched         re-store it and fall into below
                01424 ----------------------------------------------------------------
24D8            01425 chkday:           check if the x time is larger than current time
24D8  B641     01426        Lda    d,temp1         get hour:day data
24DA  D10368   01427        cmp    x,sched         compare against this
24DD  2701     01428 beq    chkda1                 if equal test more
24DF  81       01429        rts                    if not, exit
                01430
24E0            01431 chkda1:           second part of test
24E0  B644     01432        Lda    d,temp4         get current minutes
24E2  D10369   01433        cmp    x,sched+1       compare against this
24E5  81       01434        rts                    then exit    (carry=1 if, accum<x)
                01435 ----------------------------------------------------------------
24E6            01436 adjsch:           come here to adjust the scheduler pointer
24E6  5C       01437        incx                   adjust the pointer
24E7  5C       01438        incx
24E8  5C       01439        incx
24E9  5C       01440        incx                   adjust the pointer
24EA  5C       01441        incx
24EB  5C       01442        incx
24EC  A360     01443        cpx    i,Lastsh        see if all done
24EE  81       01444        rts                    then exit
                01445 ----------------------------------------------------------------
24EF            01446 dobubb:           come here to bubble sort
                01447 ----------------------------------------------------------------
24EF  A620B741 01448        mov    temp1,32        init pass counter
24F3  5F       01449 bubb1: cLrx                   top of sort Loop
24F4  D6036A   01450 bubb2: Lda    x,sched+2       get data to see if mt
24F7  DA0370   01451        ora    x,sched+8       mix with this
24FA  2746     01452        beq    bubb6           end loop if both 0
                01453
                01454 one or both data is non-zero
24FC  D6036A   01455        Lda    x,sched+2       see if this is 0
24FF  2719     01456        beq    bubb3           first data is mt, second has something, swap
                01457
                01458 first data has something, second data has none   OR
                01459 valid data in both positions.
2501  D60368   01460        Lda    x,sched         get msd of first data
2504  D1036E   01461        cmp    x,sched+6       compare against this
2507  2211     01462        bhi    bubb3           go if accum>x -- swap it
                01463
                01464 accum<=x
2509  2531     01465        blo    bubb5           bypass swap if accum<x already
                01466
                01467 accum=x  more testing is needed
250B  D60369   01468        Lda    x,sched+1       get minutes bytes
250E  D1036F   01469        cmp    x,sched+7       compare against this
2511  2529     01470        bLo    bubb5           go if good order -- accum<x
                01471
                01472 accum>=x
2513  2205     01473        bhi    bubb3           swap if accum>x
                01474
                01475 accum=x.  need to test for one shot function
2515  CD2692   01476        jsr    e,chk1st        see if accum data is one shot function
2518  2722     01477        beq    bubb5           it is in good order
                01478
251A            01479 bubb3:           swap bytes here, maybe.  test if next data is 0
251A  D60370   01480        Lda    x,sched+8       see if this is 0
251D  271D     01481        beq    bubb5           bypass bubble sort if so
```

```
                01482
251F  BF42      01483         stx    d,temp2        save x pointer
2521  A606B743  C1484         mov    temp3,6        swap this many bytes
                01485
2525            01486  bubb4:                top of swap loop
2525  D60368    01487         lda    x,sched        get data to swap
2528  B744      01488         sta    d,temp4        save it here
252A  D6036E    01489         lda    x,sched+6      get data from second position
252D  D70368    01490         sta    x,sched        install at first data
2530  B644      01491         lda    d,temp4        get data just saved
2532  D7036E    01492         sta    x,sched+6      install it
2535  5C        01493         incx                  adjust pointer
2536  3A43      01494         dec    d,temp3        adjust byte count
2538  26EB      01495         bne    bubb4          loop until done
                01496
                01497  swap is all done
253A  BE42      01498         ldx    d,temp2        retrive pointer just swaped
                01499
253C            01500  bubb5:          enter here to bump pointer only
253C  ADA8      01501         bsr    adjsch         adjust the pointer
253E  A35A      01502         cpx    i,lastsh-6     see if no more to sort
2540  26B2      01503         bne    bubb2          loop until hit 0,0 or rail
                01504
2542            01505  bubb6:          adjust pass counter here
2542  3A41      01506         dec    d,temp1        adjust pass counter
2544  26AD      01507         bne    bubb1          loop until done
                01508 ------------------------------------------------------------
                01509  the data has been sorted.
                01510
2546  C6036A    01511         lda    e,sched+2      get data
2549  2714      01512         beq    empty          go if empty
                01513
254B            01514  nextsh:   this routine will find the next scheduleed event
254B  AD4D      01515         bsr    gentim         load temp1:2:3 with current stats
254D  5F        01516         clrx                  init pointer
                01517
254E            01518  nexts1:          come here to do level test
254E  CD24D8    01519         jsr    e,chkday       subtract x data from current time
2551  250B      01520         bcs    RltX           go if Real time is les than X time
                01521  data failed the test.  adjust pointers and re-test
2553  CD24E6    01522         jsr    e,adjsch       adjust the schedule pointer
2556  2705      01523         beq    justE          exit if all done
2558  D6036A    01524         lda    x,sched+2      get data to see if past valid data
255B  26F1      01525         bne    nexts1         loop if still have good data
255D  5F        01526  justE:  clrx                 if got here, RTC is past all entries.
                01527                               load first entry
255E            01528  RltX:           Real time data is less than X time data.
                01529                  this is the next schedule
255E  81        01530         rts                   then exit
                01531
255F            01532  empty:          come here if scheduler is empty or had error
255F  1074      01533         bset   0,flags        show empty
2561  81        01534         rts                   then exit
                01535 ------------------------------------------------------------
2562            01536  dosch:          do schedule key from main menu
2562  0A920A    01537         brset  5,dsp30,resch  display next upcoming even if this again
                01538
2565            01539  dosch1:         not in schedule mode. enable it
2565  CD247B    01540         jsr    e,bubble       retrive the next pointer
2568  007415    01541         brdet  0,flags,dosch2 go if scheduler is mt
256B  BF6F      01542         stx    d,schpnt       save pointer to next schedule
256D  AD1B      01543         bsr    getsch         get the schedule data and load in memory
                01544
256F            01545  resch:          come here to re-display the current schedule
256F  A628B792  01546         mov    dsp30,00101000b turn on SCHEDUAL, NEXT EVENT
2573  3F7C      01547         clr    d,clkctl       show clock mode
2575  CD26F7    01548         jsr    e,dspnxt       display it
                01549
2578  1A79      01550         bset   5,return       flag to do starting schedule sequence
257A  CD2AEC    01551         jsr    e,waitky       wait here until key released
257D  CC20A8    01552         jmp    e,gotosp       goto sleep if key released
                01553
2580            01554  dosch2:         come here if there is no data in scheduler memory
2580  3F92      01555         clr    d,dsp30        zero mode/display flags
2582  CC20DE    01556         jmp    e,txerr        display error and back to main
                01557
2585            01558  unsch:          schedule key hit while in schedule mode.
2585  3F92      01559         clr    d,dsp30        turn off this stuff
2587  CC2101    01560         jmp    e,main         and use common exit
                01561 ------------------------------------------------------------
258A            01562  getsch:    this routine will retrive current x schedule
258A  CD2BA6    01563         jsr    e,clrseq       zero the sequence area
258D  BE6F      01564         ldx    d,schpnt       install schedule data pointer
258F  D6036A    01565         lda    x,sched+2      get data
2592  A41F      01566  getsc1:and    i,11111b       get the schedule code
                01567
2594            01568  pulsch         retirve sequence data
2594  97        01569         tax                   install sequence code
```

```
2595  A610         01571         ldaI,00010000B       INSTALL SCHEDULE CODE
2597  CC2B8B       01572         jmp    e,getqt1      get the sequence, if it exist and exit
                   01573 -------------------------------------------------------------------
259A               01574 gentim:              this routine will generate current time stats
                   01575                      temp1=combo day:hour format
                   01576                      temp2=hours only data
                   01577                      temp3,5=days only data
                   01578                      temp4=minutes data
                   01579                      temp6=trigger day code
                   01580                      temp7=trigger hours
                   01581                      temp8=trigger minute
                   01582                      temp9=trigger day:hour code
259A  9B           01583         sei                  turn off interrupts for a second
                   01584
259B  B63F         01585         Lda    d,clock+3     get day data
259D  AE20         01586         Ldx    i,32          position for shift
259F  42           01587         muL                  ddd bits are at msd of data
25OA  B743         01588         sta    d,temp3       save day only information here
25A2  B745         01589         sta    d,temp5       copy it here
25A4  BA3E         01590         ora    d,clock+2     get hour data
25A6  B741         01591         sta    d,temp1       save day/hour here
25A8  A41F         01592         and    i,00011111b   create hours only test
25AA  B742         01593         sta    d,temp2       put it here
25AC  B63DB744     01594         copy   clock+1,temp4 install minutes data
25B0  9A           01595         cli                  re-enable interrupts
                   01596
                   01597 process and install trigger codes
25B1  BE6F         01598         ldx    d,schpnt      get data from pointer
25B3  D60368       01599         lda    x,sched       get day:hours data
25B6  B749         01600         sta    d,temp9       save it here
25B8  CD3D2E       01601         jsr    e,shft5r      position it
25BB  B746         01602         sta    d,temp6       save day code
25BD  D60368       01603         lda    x,sched       get hour code
25C0  A41F         01604         and    i,00011111b   mask out day code
25C2  B747         01605         sta    d,temp7       save hour code
25C4  D60369       01606         lda    x,sched+1     get minute code
25C7  B748         01607         sta    d,temp8       save it
                   01608
                   01609 now see if current time matches
25C9  B649         01610         lda    d,temp9       get day:hours time of trigger
25CB  B141         01611         cmp    d,temp1       see if it matches real day:time
25CD  2608         01612         bne    nottim        go if not time
                   01613
                   01614 day:hours match. it could be time. check minutes
25CF  B648         01615         lda    d,temp8       get minutes
25D1  B144         01616         cmp    d,temp4       see if this matches
25D3  2602         01617         bne    nottim        go if not yet time
                   01618
25D5  99           01619         sec                  flag to show it is time
25D6  81           01620         rts                  then exit
                   01621
                   01622 nottim:              flag that it is not time yet
25D7  98           01623         clc                  clear carry
25D8  81           01624         rts                  then exit
                   01625 -------------------------------------------------------------------
25D9               01626 chksch:              come here to check if need to do schedule work
                   01627                      we received a 1.00 minute tic
25D9  1D7C         01628         bclr   6,clkctl      reset this flag
25DB  0B9219       01629         brclr  5,dsp30,nosch exit if not in schedule mode
                   01630
                   01631 in schedule mode. see if in starting or ending time
25DE  0A7903       01632         brset  5,return,chken1 go if doing starting schedule
                   01633
                   01634 waiting for ending schedule count down.
25E1  CC2645       01635         jmp    e,chkEND      do ending schedule
                   01636
25E4               01637 chken1:              this process the starting schedule
                   01638 schpnt holds next schedule to do. see if time to do it
25E4  ADB4         01639         bsr    gentim        generate timp1:2:3 times
25E6  240B         01640         bcc    notsch        exit if not time yet
                   01641
25E8  CD2167       01642         jsr    e,chklog      put display on
25EB               01643 outsch:              it is time to output the schedule
25EB  CD2095       01644         jsr    e,doCPR       start the heart beat
25EE  1679         01645         bset   3,return      confirm that a schedual sequence was sent
25F0  CC2AFC       01646         jmp    e,OUTSEQ      output sequence
                   01647
25F3               01648 notsch:              it is not time yet to output schedule. redisplay clk
25F3  3F92         01649         clr    d,dsp30       reset display flags
25F5  1A92         01650         bset   5,dsp30       sched annun must be on
                   01651
25F7               01652 nosch:               come here if no schedule work
25F7  06914B       01653         brset  3,annimg+1,chkEND process QTR tic
25FA  CD2167       01654         jsr    e,chklog      update the clock
25FD  CC20A8       01655 nosch1: jmp    e,gotosp      and then goto sleep
                   01656 -------------------------------------------------------------------
2600               01657 refsch:              come here to refresh the schedule area
2600  BE6F         01658         ldx    d,schpnt      get pointer
2602  D6036A       01659         lda    x,sched+2     get starting schedual
```

| | | | | | |
|---|---|---|---|---|---|
| 2605 | 0A7903 | 01660 | | brset 5,return,refsc1 | go if is starting schedual |
| 2608 | D6036D | 01661 | | lda x,sched+5 | get ending schedual |
| 260B | CC2592 | 01662 | refsc1:jmp | e,getsc1 | get schedual data and exit |
| | | 01663 | ------- | | -------------------------------- |
| 260E | | 01664 | CHKSCH: | come here if returned from TRANSMIT IR mode | |
| | | 01665 | | while in SCHEDUAL mode | |
| 260E | ADF0 | 01666 | | bsr refsch | refresh the schedule sequence |
| 2610 | DC2163 | 01667 | CHKSC1:jsr | e,prslog | process the clock log |
| 2613 | 24DE | 01668 | | bcc notsch | go if not time to process |
| 2615 | CD259A | 01669 | | jsr e,gentim | generate temp1:2:3 times and test for compare |
| 2618 | 25D1 | 01670 | | bcs outsch | output the schedule if time |
| 261A | 20F4 | 01671 | | bra CHKSC1 | stay in spinout loop if not time |
| | | 01672 | | | |
| 261C | | 01673 | schret: | come here if returned from sending start sequence | |
| 261C | BE6F | 01674 | | ldx d,schpnt | get pointer that was just sent |
| 261E | D6036D | 01675 | | lda x,sched+5 | get ending data |
| 2621 | 2606 | 01676 | | bne schre1 | continue if have ending sequence |
| | | 01677 | | | |
| | | 01678 | we do not have ending schedule. see if this was one shot | | |
| 2623 | AD6B | 01679 | | bsr chk1st | see if this is one shot |
| 2625 | 274F | 01680 | | beq SCHRET | use ending schedule processing if one shot |
| | | 01681 | | | |
| | | 01682 | not one shot | | |
| 2627 | 2059 | 01683 | | bra SCHRE1 | get another start sequence from scheduler |
| | | 01684 | | | |
| 2629 | | 01685 | schre1: | come here to do ending schedule | |
| 2629 | 1B79 | 01686 | | bclr 5,return | turn off starting flag |
| 262B | 1C79 | 01687 | | bset 6,return | flag to wait for ending schedule |
| 262D | D6036C | 01688 | | lda x,sched+4 | get minutes |
| 2630 | B77D | 01689 | | sta d,schdly | install it |
| 2632 | D6036B | 01690 | | lda x,sched+3 | get delay of hours |
| 2635 | AE3C | 01691 | | ldx i,60 | there is this many minutes per hour |
| 2637 | 42 | 01692 | | mul | generate number of minutes |
| 2638 | BB7D | 01693 | | add d,schdly | mix with minutes data |
| 263A | 2401 | 01694 | | bcc schre2 | bypass if no carry |
| 263C | 5C | 01695 | | incx | make carry |
| 263D | B77E | 01696 | SCHRE2: STA | d,schdly+1 | install minutes, lsd |
| 263F | BF7D | 01697 | stx | d,schdly | install minutes msd |
| 2641 | ADBD | 01698 | bsr | refsch | install the schedual data |
| 2643 | 200F | 01699 | bra | CHKEND | and display it |
| | | 01700 | | | |
| 2645 | | 01701 | chkEND: | come here if had RTC tic | |
| 2645 | 084740C | 01702 | | brset 4,flags,CHKEND | bypass this tic if had ignore flag set |
| | | 01703 | | | |
| | | 01704 | deincrement the delay time | | |
| 2648 | B67E | 01705 | | lda d,schdly+1 | get lsd of delay data |
| 264A | A001 | 01706 | | sub i,1 | adjust it |
| 264C | B77E | 01707 | | sta d,schdly+1 | put it back |
| | | 01708 | | | |
| 264E | B67D | 01709 | | lda d,schdly | get msd of delay |
| 2650 | A200 | 01710 | | sbc i,0 | adjust it |
| 2652 | B77D | 01711 | | sta d,schdly | put it back |
| | | 01712 | | | |
| 2654 | | 01713 | CHKEND: | come here if returning from IR transmit | |
| 2654 | 1974 | 01714 | | bclr 4,flags | reset the 1 minute ignore flag |
| 2656 | B67E | 01715 | | lda d,schdly+1 | get lsd of timer |
| 2658 | BA7D | 01716 | | ora d,schdly | mix with msd of timer |
| 265A | 2715 | 01717 | | beq CHKEN2 | go if time is 0 |
| | | 01718 | | | |
| 265C | 047905 | 01719 | | brset 2,return,QTRENT | bypass if in qtr mode |
| 265F | 1692 | 01720 | | bset 3,dsp30 | insure NEXT EVENT is on |
| 2661 | CD2600 | 01721 | CHKEND1: jsr | e,refsch | refresh the schedual sequence |
| | | 01722 | | | |
| 2664 | AD34 | 01723 | QTRENT:bsr | tim2go | display the time to go |
| 2666 | CD2163 | 01724 | jsr | e,prslog | process the clock |
| 2669 | 25DA | 01725 | bcs | chkEND | process if had RTC tic |
| | | 01726 | | | |
| 266B | | 01727 | d2goex: | come here to display time to go and then goto sleep | |
| 266B | CD269A | 01728 | | jsr e,tim2go | display it |
| 266E | CC20A8 | 01729 | | jmp e,gotosp | and go back to bed |
| | | 01730 | | | |
| 2671 | | 01731 | CHKEN2: | | |
| 2671 | AD27 | 01732 | | bsr tim2go | update the display |
| 2673 | CC25EB | 01733 | | jmp e,outsch | output the schedule |
| | | 01734 | | | |
| 2676 | | 01735 | SCHRET: | come here if just transmitted the ending schedule | |
| 2676 | 04790F | 01736 | | brset 2,return,QTRCAN | cancel qtr mode if this set |
| 2679 | 1D79 | 01737 | | bclr 6,return | terminate schedule mode |
| 267B | AD13 | 01738 | | bsr chk1st | check if this is one shot |
| 267D | 2603 | 01739 | | bne SCHRE1 | go if not |
| 267F | CD275A | 01740 | | jsr e,delsch | have one shot. delete schedule entry |
| | | 01741 | | | |
| 2682 | | 01742 | SCHRE1: | and continue with schedule mode | |
| 2682 | CD2167 | 01743 | | jsr e,chklog | update the clock display, if needed |
| 2685 | CC2565 | 01744 | | jmp e,dosch1 | and continue |
| | | 01745 | ------- | | -------------------------------- |
| 2688 | | 01746 | QTRCAN: | | cancel qtr mode |
| 2688 | 1579 | 01747 | | bclr 2,return | remove this flag |

```
268A  CD208C      01748         jsr    e,clrann        clear out all annun
268D  CC20Ef      01749         jmp    e,rthere        and exit
                  01750 ------------------------------------------------------------
2690              01751 chklst:                come here to check if have one shot data
2690  BE6F        01752         ldx    d,schpnt        load printer
2692  D6036A      01753 chklst: lda    x,sched+2       get coding
2695  A460        01754         and    i,01100000b     mask it in
2697  A140        01755         cmp    i,01000000b     see if one shot
2699  81          01756         rts          * then exit
                  01757 ------------------------------------------------------------
269A              01758 tim2go:             this routine will display schdly time as
                  01759                     time for next event output
269A  1192        01760         bclr   0,dsp30         insure TIME is off
269C  B67E        01761         lda    d,schdly+1      get lsd
269E  BE7D        01762         ldx    d,schdly        get msd
26A0  CD3AC5      01763         jsr    e,div60         divide it by 60
26A3  B77F        01764         sta    d,work1         install minutes
26A5  BF80        01765         stx    d,work2         install hours
26A7  CD3774      01766         jsr    e,dspset        display as a delay
26AA  CC39B8      01767         jmp    e,dsqnam        display the sequence name and exit
                  01768 ------------------------------------------------------------
                  01769         The schedule routine is structured as follows:
                  01770         Upon entry, display top schedule name and real time clock
                  01771              keys allowed
                  01772              * cancel returns to learn menu, SCH off
                  01773              insert enters edit mode with blank name/data fields
                  01774              delete delete current schedule (both starting and ending)
                  01775              edit   enters edit mode for displayed schedule
                  01776              scroll ^ selects previous schedule name
                  01777              scroll v selects next schedule name
                  01778
                  01779         The day options are:
                  01780              daily five day
                  01781              daily week end
                  01782              weekly
                  01783              weekly one shot
                  01784
                  01785 The general purpose flags are used to give store and editing direction
                  01786         7 6 5 4 3 2 1 0
                  01787         . . . . . . . . set if scheduler memory is empty
                  01788         . . . . . . . set if in display/edit START time, reset if START name
                  01789         . . . . . . set if in display/edit delay, end name, reset if not
                  01790         . . . . . set if scheduler is full
                  01791         set if in insert mode
                  01792
26AD              01793 edsch6:         delete--it's time to stomp through the tulips, guys.
26AD  CD275A      01794         jsr    e,delsch        delete the current schedual
                  01795
26B0              01796 edsch:          edit schedule mode here
26B0  3F6F        01797         clr    d,schpnt        clear sch pointer
26B2  1A92        01798         bset   5,dsp30         display SCED annun
26B4  CD247B      01799         jsr    e,bubble        sort the schedule memory
26B7  017405      01800         brclr  0,flags,edsch1  go if scheduler is not empty
                  01801
                  01802 scheduler is mt
26BA  CD388F      01803         jsr    e,schmt         show scheduler is mt
26BD  2008        01804         bra    edschC          go if have key or time out
                  01805
26BF              01806 edsch1:                        and continue
26BF  CD258A      01807         jsr    e,getsch        get schedule data
                  01808
26C2              01809 edsch2:                come here to display schedule name
26C2  AD33        01810         bsr    dspnxt          display next schedule
26C4  CD3873      01811         jsr    e,dlykey        protect the display and get a key
                  01812
26C7  4D          01813 edschC: tsta                   see if had timeout
26C8  263F        01814         bne                    go if not
                  01815
26CA              01816 SCHCAN:                come here if cancel key is pressed
26CA              01817 edschE:                come here to exit mode
26CA  CC21E5      01818         jmp    e,lrncan        and exit
                  01819 ------------------------------------------------------------
26CD              01820 schtim:         this routine will pack and retrive schedule time
                  01821                 for display tempD:E:F:G:H:I holds data
26CD  B66FB753    01822         copy   schpnt,tempJ    init source pointer
26D1  3F54        01823         clr    d,tempK         init destination pointer
                  01824
26D3  BE53        01825 schti1: ldx    d,tempJ         get source pointer
26D5  D60368      01826         lda    x,sched         get data
26D8  BE54        01827         ldx    d,tempK         get destination pointer
26DA  E74D        01828         sta    x,tempD         install data
26DC  5C          01829         incx                   adjust destination pointer
26DD  BF54        01830         stx    d,tempK         install it here
26DF  3C53        01831         inc    d,tempJ         adjust source pointer
26E1  A306        01832         cpx    i,6             see if all done
26E3  26EE        01833         bne    schti1          loop if not
                  01834
26E5  B64D        01835         lda    d,tempD         get starting hours data
26E7  A41F        01836         and    i,00011111b     mask in hours
```

```
26E9  B780       01837 schti2: sta    d,work2          install it
26EB  B64D       01838         lda    d,tempD          re-get data
26ED  CD3D2E     01839         jsr    e,shft5r         position it
26F0  B781       01840         sta    d,work3          install it
26F2  B64EB77F   01841         copy   tempE,work1      install minutes
26F6  81         01842         rts                     then exit
           01843 ------------------------------------------------------------
26F7       01844 dspnxt:            come here to display the nextschedule entry
26F7  ADD4       01845         bsr    schtim           retrive and pack schedule time
26F9  1192       01846         bclr   0,dsp30          turn off RTC
26FB  3F7C       01847         clr    d,clkctl         erase all
26FD  CD3768     01848         jsr    e,dspSCH         display the trigger time or schedual
2700  CC39B8     01849         jmp    e,dsqnam         display the scheduler name and exit
           01850 ------------------------------------------------------------
2703       01851 edFULL:          come here if need to accept key when area is full
2703  CD389F     01852         jsr    e,schful         display message
2706  4D         01853         tsta                    see if cancel or timeout
2707  27C1       01854         beq    edschE           exit if so
           01855
2709       01856 edsch3:               still checking keys
2709  007813     01857         brset  0,editor,edscH3  go if insert key pressed
           01858
270C  0074A1     01859         brset  0,flags,edsch    loop if buffer mt (no other key allowed)
           01860
270F  047821     01861         brset  2,editor,edsch4  go if scroll ^
           01862
2712  067822     01863         brset  3,editor,edsch5  go if had scroll v key
           01864
2715  027895     01865         brset  1,editor,edsch6  go if had delete key
           01866
2718  A329       01867         cpx    i,schkey         see if its schedule (edit) key
271A  26A6       01868         bne    edsch2           ignore key if so
271C  CC279B     01869         jmp    e,edsch7         go if so
           01870
271F       01871 edscH3:                do scheduler insert
271F  5F         01872         clrx                    init pointer
2720  3F6F       01873         clr    d,schpnt         init this also
2722  D6036A     01874 edsH3a: lda    x,sched+2        get data at current point
2725  2707       01875         beq    edsH3b           go if found empty spot
           01876
           01877 have not found empty spot.  adjust pointer
2727  CD24E6     01878         jsr    e,adjsch         adjust the schedule pointer
272A  26F6       01879         bne                    loop if not full
272C  20D5       01880         bra    edFULL           show we are too full
           01881
272E       01882 edsH3b:            come here if found empty spot to use for insert
272E  BF6F       01883         stx    d,schpnt         store pointer
2730  CC2823     01884         jmp    e,schins         do schedule insert
           01885
2733       01886 edsch4:              have scroll up key.  go up in time
2733  A606       01887         lda    i,6              install next pointer count
2735  2002       01888         bra    sclprs           and continue
           01889
2737       01890 edsch5:              have scroll down key.  Go back in time.
2737  A6FA       01891         lda    i,-6             install next point count
           01892
2739       01893 sclprs:              this is a common scroll key processor
2739  B741       01894         sta    d,temp1          store increment
273B  BB6F       01895 scl1:   add    d,schpnt         sum with current pointer
273D  97         01896         tax                     install it here
273E  B76F       01897         sta    d,schpnt         save it here also
           01898
           01899 now test for pointer limits
2740  A160       01900         cmp    i,lastsh         see if went forward too far
2742  250D       01901         blo    scl5             go if not too far -- in limits
           01902
           01903 higher or negative here
2744  2B05       01904         bmi    scl3             go if negative
           01905
           01906 just too high here.  make it point to first one
2746  3F6F       01907         clr    d,schpnt         init pointer
2748  CC26BF     01908 scl2:   jmp    e,edsch1         and loop
           01909
274B       01910 scl3:             come here if negative pointer
274B  A660B76F   01911         mov    schpnt,lastsh    install too far for forward data
274F  2005       01912         bra    scl6             and use common
           01913
2751       01914 scl5:             come here if in range pointer
2751  D6036A     01915         lda    x,sched+2        look at data here
2754  26F2       01916 bne     scl2                    have data.  use it
           01917
2756       01918 scl6:            if got here, data is not present at current pointer
2756  B641       01919         lda    d,temp1          get direction data
2758  20E1       01920         bra    scl1             and loop until have good data
           01921 ;-----------------------------------------------------------
           01922 edsch6:           delete--it's time to stomp through the tulips, guys.
           01923         bsr    delsch           delete the current schedual
           01924         jmp    e,edsch          and restart the editor
           01925 ------------------------------------------------------------
```

```
275A              01926 delsch:              come here to delete the current schedule entry
275A BE6F         01927        ldx    d,schpnt       load the current pointer
275C D6036A       01928        lda    x,sched+2      get the code
275F A40F         01929        and    i,00001111b    flag for start sequence
2761 AD21         01930        bsr    fndsch         point to schedule
2763 2502         01931        bcs    tulip1         go if did not find it
2765 AD16         01932        bsr    edschZ         remove the schedule from bulk memory
                  01933
2767              01934 tulip1:              start complete. do ending one
2767 186D         01935        bset   4,seqpnt       create ending code
2769 AD03         01936        bsr    zapsch         delete it from schedular and bulk
276B CC24EF       01937        jmp    e,dobubb       sort the deleted 0s to the end of file, exit
                  01938 ----------------------------------------------------------------
276E              01939 zapsch:              write accum to schedule memory at x
276E BE6F         01940        ldx    d,schpnt       get pointer
2770 A606B741     01941        mov    temp1,6        install counter
2774 4F           01942        clra                  install this to clear it
2775 D70368       01943 zapsc1: sta   x,sched        clear it out
2778 5C           01944        incx                  adjust pointer
2779 3A41         01945        dec    d,temp1        adjust counter
277B 26F8         01946        bne    zapsc1         loop until done
                  01947
277D              01948 edschZ:              this routine will zap the schedule in seqpnt
277D BE6D         01949        ldx    d,seqpnt       get code to delete
277F A610         01950        lda    i,00010000b    install schedule code
2781 CC300D       01951        jmp    e,delax        zap it and exit
                  01952 ----------------------------------------------------------------
2784              01953 fndsch:              this routine will search through the schedule area
                  01954                      looking for a match to accum.
                  01955                      it will set carry if not found, cc if found
2784 B76D         01956        sta    d,seqpnt       save it here
2786 5F           01957        clrx                  init pointer
2787 D6036A       01958 fndsc1: lda   x,sched+2      get code to test
278A 270D         01959        beq    fndsc3         exit if all done (no more data)
278C B86D         01960        eor    d,seqpnt       mix with this
278E A41F         01961        and    i,11111b       mask code in
2790 2602         01962        bne    fndsc2         go if not same
                  01963
                  01964 data is the same
2792 98           01965        clc                   show found it
2793 81           01966        rts                   then exit
                  01967
2794              01968 fndsc2:           correct pointer
2794 CD24E6       01969        jsr    e,adjsch       adjust schedule pointer
2797 26EE         01970        bne    fndsc1         loop until done
                  01971
2799              01972 fndsc3:           come here if can't find it
2799 99           01973        sec                   set carry
279A 81           01974        rts                   then exit
                  01975 ----------------------------------------------------------------
279B              01976 edsch7:           edit current schedule being displayed
279B CD2C42       01977        jsr    e,ecdname      edit the sequence name
279E 4D           01978        tsta                  see if time out
279F 2739         01979        beq    edscHE         do edit schedular cancel if so
                  01980
                  01981 have store key. set up to edit schedule times
27A1 CD26CD       01982        jsr    e,schtim       pack schedule time
27A4 B64F         01983        lda    d,tempF        get daily information
27A6 A460         01984        and    i,01100000b    mask in daily information
27A8 CD3D2E       01985        jsr    e,shft5r       position it
27AB AB04         01986 again: add   i,4             create text index code
27AD A107         01987        cmp    i,7            see if less than this
27AF 25FA         01988        blo    again          do it once more if so
                  01989
27B1 A108         01990        cmp    i,8            see if greater than this
27B3 2202         01991        bhi    again1         continue without mods if so
27B5 B781         01992        sta    d,work3        install as day code if less
                  01993
27B7 3F53         01994 again1: clr   d,tempJ        init time edit flags
27B9 1E53         01995        bset   7,tempJ        flag that this is schedual mode
27BB AD20         01996        bsr    estart         edit the starting data
27BD 241B         01997        bcc    edscHE         do error exit if time out
                  01998
27BF CD2CB0       01999        jsr    e,edseqd       edit sequence data
27C2 4D           02000        tsta                  see if cancel or time out
27C3 2715         02001        beq    edscHE         exit if so
                  02002
                  02003 have store key. save starting sequence
27C5 CD28CD       02004        jsr    e,storeS       store the starting schedule
                  02005
                  02006 pull in ending time data, if present
27C8b650b780      02007        copy   tempG,work2    install hours
27CC B651B77F     02008        copy   tempH,work1    install minutes of delay
                  02009
                  02010 edsch8:           work1:2 holds minutes:hours of lenght
27D0 1D53         02011        bclr   6,tempJ        re-init auto clear flag
27D2 CD29DF       02012        jsr    e,usedly       do editing on lenght
27D5 2403         02013        bcc    edscHE         go if so
                  02014
```

```
                02015 have store key.  work1:2 holds edited minutes:hours of lenght
27D7  CC286F    02016      jmp   e,edshC0         and use common
                02017
27DA  CC26B0    02018 edscH: jmp  e,edsch         have error -- goto shedual edit mode
                02019 ------------------------------------------------------------------
27DD            02020 estart:                     this routine will edit the starting time data.
                02021                             it will also ask for one shot data if needed.
27DD  CD29BA    02022      jsr   e,setsch         and edit time/date data
27E0  243F      02023      bcc   estar2           exit if had time out
                02024
27E2  CD2267    02025      jsr   e,draft          correct for civilian time
27E5  B681B782  02026      copy  work3,work4      copy this data
27E9  A106      02027      cmp   i,6              see if less than this
27EB  2216      02028      bhi   shot4            do not ask one shot question if higher
                02029
                02030 have weekly code -- process one shot question
27ED            02031 shot1:                      ask if one shot mode
27ED  1B7C      02032      bclr  5,clkctl         reset clock display permission
27EF  CD389B    02033      jsr   e,onesht         display it
27F2  4D        02034      tsta                   see if cancel or time out
27F3  272C      02035      beq   estar2           go if so
                02036
27F5  007805    02037      brset 0,editor,shot2   go if yes key
                02038
27F8  027806    02039      brset 1,editor,shot3   go if no key
                02040
27FB  20F0      02041      bra   shot1            just loop if neither
                02042
27FD            02043 shot2:           yes key pressed
27FD  A601      02044      lda   i,01b            install weekly code
27FF  2002      02045      bra   shot4            and continue
                02046
2801            02047 shot3:           no key pressed
2801  A602      02048      lda   i,10b            install one shot code
2803  CD3D27    02049 shot4: jsr  e,shft51        position it
2806  B781      02050      sta   d,work3          install into register
                02051
2808  B64F      02052      lda   d,tempF          get this data, if any
280A  A40F      02053      and   i,00001111b      mask in sequence number
280C  AA80      02054      ora   i,10000000b      install in use code
280E  BA81      02055      ora   d,work3          mix with one shot code
2810  B74F      02056      sta   d,tempF          install it
                02057
2812  B682      02058 shot5: lda  d,work4         get day data
2814  CD3D27    02059      jsr   e,shft51         position it
2817  BA80      02060      ora   d,work2          install hours binary
2819  B74D      02061      sta   d,tempD          save it
281B  B67FB74E  02062      copy  work1,tempE      install minutes
                02063
281F            02064 estar1:              come here for good exit
281F  99        02065      sec                    flag it
2820  81        02066      rts
                02067
2821            02068 estar2:              come here for bad exit
2821  98        02069      clc                    clear it
2822  81        02070      rts                    then exit
                02071 ------------------------------------------------------------------
2823            02072 schins:
2823  AE05      02073      ldx   i,5              point to tempI
2825  6F4D      02074 schin0: clr x,tempD         clear it out
2827  6F7F      02075      clr   x,work1          clear out timer area also
2829  5A        02076      decx                   adjust pointer
282A  2AF9      02077      bpl   schin0           loop unti done
                02078
282C            02079 schin1:
282C  CD2BA6    02080      jsr   e,clrseq         clear out the sequence work area
282F  CD2C04    02081      jsr   e,asknam         ask for sequence name
2832  4D        02082      tsta                   see if timeout or cancel
2833  2704      02083      beq   schCAN           do cancel
                02084
                02085 had store here.  ask for start time
2835  ADA6      02086      bsr   estart           edit the start time
2837  2503      02087      bcs   schin8           continue if not time out or cancel
                02088
2839            02089 schCAN:              come here if seen cancel key
2839  CC26CA    02090      jmp   e,SCHCAN         go to cancel routine
                02091
283C            02092 schin8:              now create an unused schedule number
283C  5F        02093      clrx                   init pointer
283D  3F7F      02094      clr   d,work1          this will be the hunted
                02095
283F            02096 schinD:              top of search loop
283F  D6036A    02097      lda   x,sched+2        get data from memory
2842  2712      02098      beq   schinF           if no data here, end of schedular
2844  A40F      02099      and   i,1111b          mask sequence number in
2846  B17F      02100      cmp   d,work1          see if same as this
2848  2707      02101      beq   schinE           go if found one
                02102
                02103 hunded not found in this one.  search on
```

```
284A CD24E6      02104         jsr     e,adjsch         adjust the schedule pointer
284D 2707        02105         beq     schinF           go if hit rail
284F 20EE        02106         bra     schinD           continue with search if not
                 02107
2851             02108 schinE:                  we found a match of the hunted. search on
2851 3C7F        02109         inc     d,work1          create new hunted
2853 5F          02110         clrx                     init pointer
2854 20E9        02111         bra     schinD           and loop
                 02112
2856             02113 schinF:           we have identified a valid sequence number
2856 B67F        02114         lda     d,work1          get sequence number
2858 BA4F        02115         ora     d,tempF          mix with this
285A B74F        02116         sta     d,tempF          put it back
                 02117
                 02118 now enter start sequence data
285C 3F6D        02119         clr     d,seqpnt         clear the pointer
285E CD3887      02120         jsr     e,strseq         ask for key to do start sequence
2861 CD2D1A      02121         jsr     e,edseD3         edit the sequence data
2864 4D          02122         tsta                     see if cancel
2865 27D2        02123         beq     schCAN           do cancel key
                 02124
                 02125 have store key. save starting sequence
2867 CD28CD      02126         jsr     e,stores         save starting sequence and code
                 02127
                 02128 now ask for lenght
286A CD29DD      02129         jsr     e,setdly         get and edit ending time
286D 24CA        02130         bcc     schCAN           exit if cancel or time out
                 02131
                 02132 we have store key
                 02133
286F             02134 edshC0:              enter here from editing mode
286F B67F        02135         lda     d,work1          check if have time data
2871 BA80        02136         ora     d,work2
2873 261A        02137         bne     edshCo           go if have delay data
                 02138
                 02139 there will not be an ending sequence
2875 3D52        02140         tst     d,tempI          see if there WAS one
2877 2735        02141         beq     schinI           do if not
                 02142
                 02143 there was a ending schedule sequence. zap it
2879 3F50        02144         clr     d,tempG          zero these
287B 3F51        02145         clr     d,tempH
287D 3F52        02146         clr     d,tempI
287F AD07        02147         bsr     putend           generate the ending schedule code
2881 B76D        02148         sta     d,seqpnt         install here
2883 CD277D      02149         jsr     e,edschZ         delete it
2886 2026        02150         bra     schinI           and continue
                 02151 ----------------------------------------------------------------
                 02152 putend:           this routine will generate the ending sequence code
2888 B64F        02153         lda     d,tempF          get starting data
288A AA10        02154         ora     i,00010000b      create ending data
288C A41F        02155         and     i,00011111b      mask out daily code
288E 81          02156         rts                      then exit
                 02157 ----------------------------------------------------------------
288F             02158 edshCo:           we have stop time. create another sequence
288F CD2BB0      02159         jsr     e,clrsed         zero the ending sequence area
2892 B67FB751    02160         copy    work1,tempH      install minutes data
2896 B680B750    02161         copy    work2,tempG      install hours of delay
                 02162
289A ADEC        02163         bsr     putend           generate the ending schedule code
289C B752        02164         sta     d,tempI          install it here
289E CD2592      02165         jsr     e,getscl         get the ending schedual
                 02166
28A1 3F6D        02167         clr     d,seqpnt         clear the pointer
                 02168
28A3             02169 schinG;                  now edit the ending sequence
28A3 CD388B      02170         jsr     e,endseq         display END SEQ
28A6 CD2D1A      02171         jsr     e,edseD3         install it
28A9 4D          02172         tsta                     see if cancel
28AA 271C        02173         beq     schinK           ignore store if cancel
                 02174
28AC             02175 schinH:              had store key. install it
28AC AD23        02176         bsr     storeE           store the ending schedule data
                 02177
28AE             02178 schinI:              and exit back to edit mode
28AE B66FB754    02179         copy    schpnt,tempK     install destination pointer
3F53             02180         clr     d,tempJ          install source pointer
28B4 BE53        02181 schinJ: ldx     d,tempJ          get source pointer
28B6 E64D        02182         lda     x,tempD          get data
28B8 BE54        02183         ldx     d,tempK          get destination pointer
28BA D70368      02184         sta     x,sched          install data
28BD 5C          02185         incx                     adjust destination pointer
28BE BF54        02186         stx     d,tempK          install it here
28C0 3C53        02187         inc     d,tempJ          adjust source pointer
28C2 B653        02188         lda     d,tempJ          get source pointer
28C4 A106        02189         cmp     i,6              see if all done
28C6 26EC        02190         bne     schinJ           loop if not
                 02191
28C8             02192 schinK:              come here to bypass store
```

```
28C8  3F6F      02193         clr    d,schpnt      zero this
28CA  CC26BF    02194         jmp    e,edsch1      and loop
                02195 ------------------------------------------------------
28CD            02196 stores:                      store srarting sequence data here
28CD  B64F      02197         lda    d,tempF       get starting data
28CF  2002      02198         bra    storEE        and use common
                02199
28D1            02200 storE:                       store ending sequence data here
28D1  B652      02201         lda    d,tempI       get ending sequence data
                02202                              and fall into below
28D3            02203 storEE:                      come here to store the sequence portion of the
                02204                              schedule
28D3  B754      02205         sta    d,tempK       install starting or ending data here
28D5  CD2BE3    02206         jsr    e,bufseq      position the data into storage
28D8  B654      02207         lda    d,tempK       get coded data
28DA  A41F      02208         and    i,00011111b   create key code
28DC  97        02209         tax                  install it
28DD  A610      02210         lda    i,00010000b   insert schedule code
28DF  CC313E    02211         jmp    e,Rplace      istall into memory and exit
                02212 *include DISPAT2/9ROUT       install Keyboard response process
                02213         segment     com 0    Com 1     Com 2     Com 3
                02214                     bit 0    BIT 1     BIT 2     BIT 3
                02215          |           |        |         |         |
                02216          v           v        v         v         v
                02217 ------------------------------------------------------
                02218 Alpha 0             h        i          k         n
                02219    6   1            TAPE     f          e         d
                02220        2            a        b          c         TV
                02221        3            g        j          l         m
                02222 ------------------------------------------------------
                02223 Alpha 4             h        i          k         n
                02224    5   5            IR       f          e         d
                02225        6            a        b          c         TIME
                02226        7            g        j          l         m
                02227 ------------------------------------------------------
                02228 Alpha 8             h        i          k         n
                02229    4   9            f                   e         d
                02230        10           a        b          c         NEXT EVENT
                02231        11           g        j          l         m
                02232 ------------------------------------------------------
                02233 Alpha 12            h        i          k         n
                02234    3   13           QTR      f          e         d
                02235        14           a        b          c         CD
                02236        15           g        j          l         m
```

What is claimed is:

1. A handheld controller for transmitting instructions to plurality of remotely controllable devices and for receiving and storing a schedule of at least one operating event input by a user to be executed at a preselected time, the remote controller comprising:

(a) a keyboard including a plurality of keys for inputting instructions from a user;

(b) a memory for storing instructions to be performed by said remote controller;

(c) a multiple-day function flag associated with said at least one operating event for indicating whether said at least one operating event is to be executed on more than one day at said preselected time;

(d) a multiple-week function flag associated with said at least one operating event for indicating whether said at least one operating event is to be executed only once or weekly;

(e) a clock for tracking real time;

(f) comparison means connected to said clock, said keyboard, and said memory for comparing a current time tracked by said clock to said preselected time stored in said memory and for issuing a start signal when said current time is equal to said preselected time;

(g) means for wireless transmission of a particular set of instructions to said plurality of remotely controllable devices in response to said start signal to initiate execution of said at least one operating event;

(h) means for detecting if said multiple-day function flag is set and for repeating said at least one operating event at said preselected time only on weekdays if said multiple-day function flag is set to a first state and repeating said at least one operating event at said preselected time only on weekend days if said multiple-day function flag is set to a second state; and (i) means for detecting if said multiple-week function flag is set and for executing said at least one operating event weekly if said multiple-week function flag is set and executing said at least one operating event only once if said multiple-week function flag is not set.

2. The remote controller of claim 1 further including means for resetting the multiple-day function flag after the particular operating session is repeated a selected number of times.

3. The remote controller of claim 1 wherein the memory comprises a RAM for storing temporary instructions learned by said hand held controller, data, and the schedule of operating sessions created by the user to be performed by said hand held controller.

4. The remote controller of claim 1 wherein the memory comprises ROM for storing permanent instructions to be performed by said hand held controller in response to commands input by the user via the keyboard.

5. A reconfigurable universal remote controller capable of learning and storing control signals for controlling a plurality of remotely controllable devices, such that the control signals are transmitted by a remote control transmitter associated with one of the plurality of remotely controllable devices and then received and learned by the remote controller, which learned control signals are stored in a signal storage location for later use, and for receiving and storing in the remote controller a schedule of at least one operating event defined by instructions input by a user to be executed at a preselected time, the remote controller comprising:
- (a) a keyboard having a plurality of keys for inputting instructions from a user, said instructions specifying at least one selected execution time for said at least one operating event, and a portion of said keys being operable for accessing said stored control signals for output by said controller;
- (b) a memory for storing said instructions to be performed by said controller;
- (c) a multiple-day function flag associated with said at least one operating event that, when set, signifies that said at least one operating event is to be executed on more than one day at said preselected time,
- (d) a multiple-week function flag associated with said at least one operating event for indicating whether said at least one operating event is to be executed only once or weekly;
- (e) a clock for tracking real time;
- (f) comparison means coupled to said clock, said keyboard, and said memory for comparing a current time stored in said memory and for issuing a start signal when said current time is equal to said at least one selected execution time stored in said memory and for issuing a start signal when said current time is equal to said at least one selected execution time;
- (g) means for wireless transmission of a particular set of said instructions stored in said memory to at least one of said plurality of remotely controllable devices in response to said start signal;
- (h) means for detecting said state of said multiple-day function flag so that said at least one operating event is automatically repeated by said controller only on week days at said selected execution time if said multiple-day function flag is set to a first state and only on weekend days at said preselected execution time if said multiple-day function flag is set to a second state; and
- (i) means for detecting if said multiple-week function flag is set and for executing said at least one operating event weekly if said multiple-week function flag is set and executing said at least one operating event only once if said multiple-week function flag is not set.

6. The invention according to claim 5 further comprising a control signal detector coupled to the control signal storage location for detecting the received control signals.

7. The invention according to claim 5 further comprising a signal decoder coupled to the signal storage location for decoding the received control signals before storage in the signal storage location.

8. A handheld controller for controlling a plurality of remotely controllable devices by transmitting instructions to the plurality of remotely controllable devices and for receiving and storing a schedule of at least one operating event input by a user to be executed at a preselected time, the remote controller comprising:
- (a) a user interface for inputting instructions by a user;
- (b) a memory for storing instructions to be performed by said remote controller;
- (c) a multiple-day function flag that, when set, signifies that said at least one operating event is to be executed on more than one day at said preselected time,
- (d) a multiple-week function flag associated with said at least one operating event for indicating whether said at least one operating event is to be executed only once or weekly;
- (e) a clock for tracking real time;
- (f) a comparator connected to said clock and said memory for comparing a current time tracked by said clock to said preselected time stored in said memory and for issuing a start signal when said current time is equal to said preselected time;
- (g) means for wireless transmission of a particular set of said instructions to at least one of said plurality of remotely controllable devices in response to said start signal;
- (h) a detector for detecting if said multiple-day function flag is set to indicate week day operation and enabling said remote controller to repeat said at least one operating event only on week days at said preselected time if said multiple-day function flag is set to indicate week day operation and for detecting if said multiple-day function flag is set to indicate weekend operation and enabling said remote controller to repeat said at least one operating event only on weekend days at said preselected time if said multiple-day function flag is set to indicate weekend operation; and
- (i) means for detecting if said multiple-week function flag is set and for executing said at least one operating event weekly if said multiple-week function flag is set and otherwise executing said at least one operating event only once.

* * * * *